United States Patent

[11] 3,598,375

[72] Inventor Robin G. F. Nauta
 Stamford, Conn.
[21] Appl. No. 863,816
[22] Filed Oct. 6, 1969
[45] Patented Aug. 10, 1971
[73] Assignee Dorr-Oliver Incorporated
 Stamford, Conn.

[54] FLUIDIZED BED REACTOR
 31 Claims, 19 Drawing Figs.
[52] U.S. Cl. ........................................ 263/21 A,
 34/57 A
[51] Int. Cl. ........................................ F27b 15/00

[50] Field of Search........................................ 34/57 R, 57
 A; 263/21 A

[56] References Cited
 UNITED STATES PATENTS
 2,529,366 11/1950 Bauer.......................... 263/21 A
 2,782,019 2/1957 Turney et al................. 263/21 A
 2,789,034 4/1957 Swaine et al................. 34/57 A Primary Examiner—John J. Camby
Attorneys—Theodore M. Jablon and D. M. Mezzapelle ABSTRACT: A fluidized bed reactor featuring a self-contained prefabricated wind box structure.

INVENTOR.
ROBIN G. F. NAUTA
BY Theodore M. Jablon
ATTORNEY.

INVENTOR.
ROBIN G. F. NAUTA
BY Theodore M. Jablon
ATTORNEY.

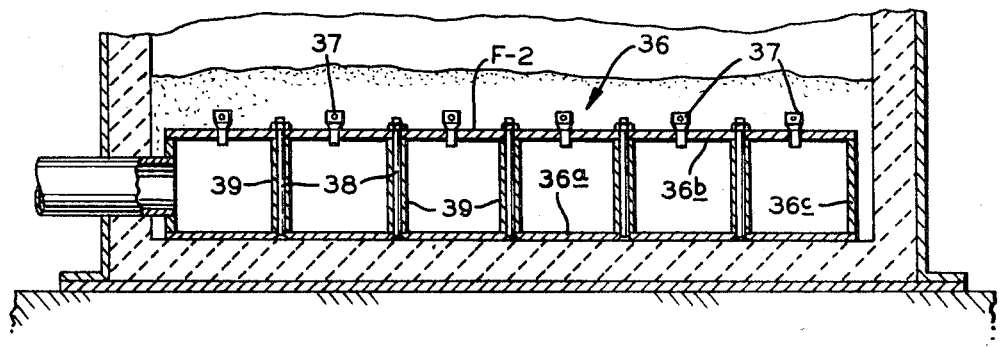
FIG. 7
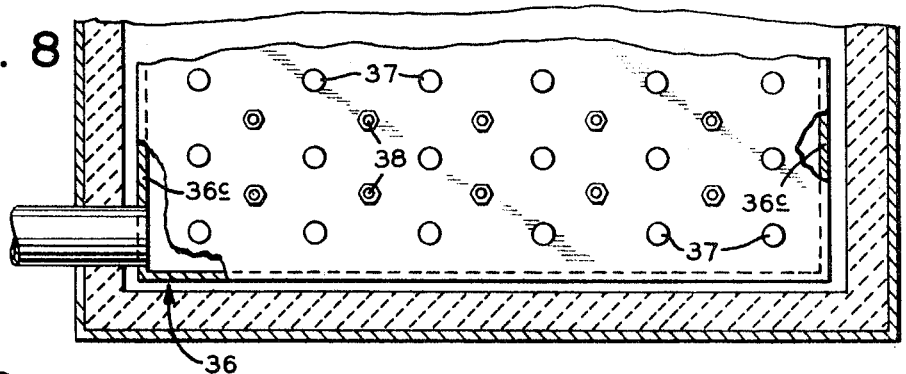
FIG. 8
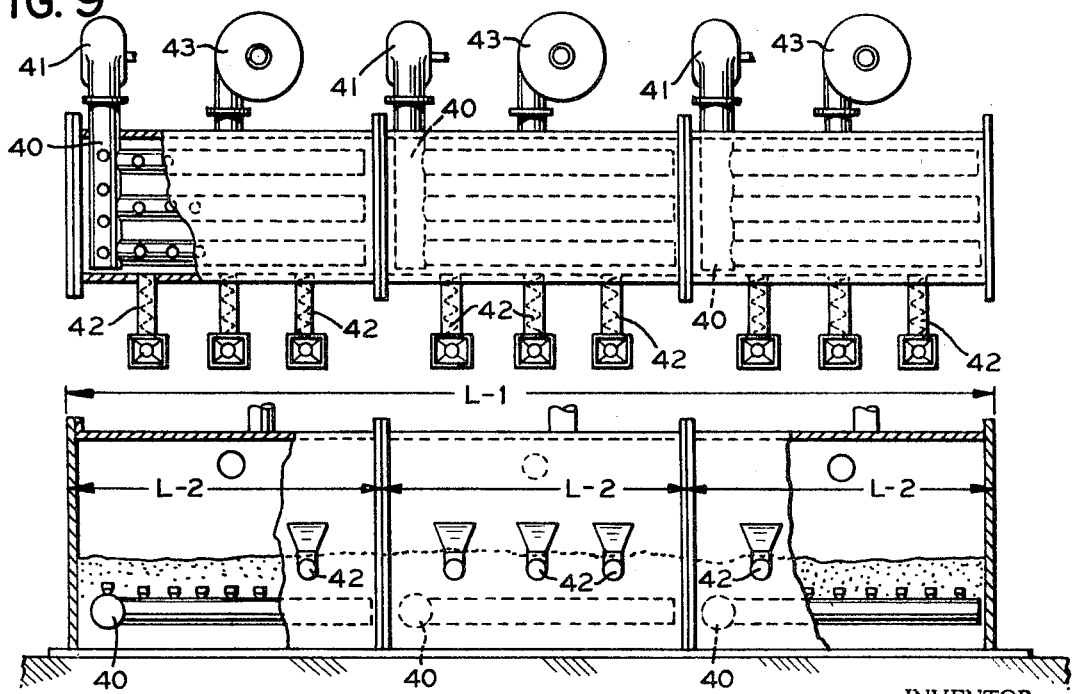
FIG. 9
FIG. 10
INVENTOR.
ROBIN G. F. NAUTA
BY Theodore M. Jablon
ATTORNEY.

INVENTOR.
ROBIN G. F. NAUTA
BY Theodore M. Jablon
ATTORNEY.

INVENTOR.
ROBIN G. F. NAUTA
BY Theodore N. Jablon
ATTORNEY.

FLUIDIZED BED REACTOR

This invention relates to continuously operating fluidized bed reactors wherein a bed of solid particles is treated or reacted with, or subjected to combustion, with a fluidizing gas supplied under pressure through a wind box which supports the bed in a state of fluidization.

From the wind box the gases rise into a reaction chamber or zone receiving a continuous supply of the material to be treated, while the solids and/or gaseous reaction products are continuously removed.

The behavior, appearance, and physical characteristics of the bed of fluidized material are comparable to those of a body of boiling liquid the specific gravity of which depends upon the density at which bed is maintained by the upflowing fluidizing gas.

The spent hot gases resulting from the combustion or other chemical reactions or other fluidizing treatment operation, along with dust particles blown from the bed escape as stack gases from the top end of the reactor unit. The dust particles in the stack gases are usually trapped in a cyclone followed by a scrubber. The wind box gas pressure must be high enough to overcome the sum total of flow resistances including pressure differential across the constriction plate plus the differential needed for sustaining the fluidized condition of bed.

Examples of fluidized bed operation, applicable to this invention are found in metallurgical operations such as the fluidizing gas, the combustion of dewatered moist sewage sludge in a bed of hot sand fluidized by the combustion air (disclosed in U.S. Pat. to No. 3,319,586 to Albertson and Budd); the heating or drying of the material as by inert hot combustion gases; or the cooling of treated hot material by a fluidizing gas or by air being thus preheated for use in a subsequent treatment or oxidizing treatment in a fluidized bed.

The invention is applicable to a type of reactor having a basically elongate rectangular configuration, as distinguished from the cylindrical type which has a constriction plate. The so-called tuyeres or nozzles inserted into the openings of the constriction plate distribute the fluidizing gas into the bed, while preventing backflow of the material downwardly through the plate during periods of interruption of the operation.

In the cylindrical type of reactor the material to be treated must be introduced by way of one or a plurality of feeders spaced from one another along the periphery of the reactor shell. Aside from a relatively cumbersome feed apparatus leading to, and surrounding the cylindrical reactor, there is a drawback in that the material undergoing treatment or combustion may not be evenly distributed across the area of the bed, so that substantial portions of the fluidizing gas or-air and of the bed area, particularly the central portion thereof, are lost.

Another problem of the cylindrical-type reactor of large diameter is due to wind box gas pressure exerted upon the underside of the constriction plate, especially where the constriction plate is of a composite refractory block construction supported by the surrounding walls of the reactor.

While the rectangular elongate-type reactor may avoid uneven or inadequate feed distribution in the bed, for instance where a material in state of fluidization is caused to move over the elongate constriction plate from inlet end to outlet end of the reactor, there is nevertheless inherent in this type of rectangular reactor the problem of containing the required wind box pressure against the planar walls of the wind box chamber and against the constriction plate itself, even though the width of the constriction plate may be small relative to its length.

In view of the above-stated problems, it is one of the objects of this invention to provide a reactor with a wind box that is highly pressure resistant in its own right, while avoiding the problems of the conventional constriction plate.

Another object is to provide a reactor having a simplified feed arrangement whereby an effective and substantially uniform and rapid distribution is attainable of the feed material over the area of the fluidized bed.

Another object is to provide a compact elongate system or assembly of reactor units, capable of being extended by the lengthwise addition of such units.

Still another object is to provide a wind box structure that is free from the above-stated drawbacks of the conventional, and independent of the wall support.

In order to attain the foregoing objectives, this invention provides a reactor unit with a wind box in the form of a separately prefabricated wind box structure located in the lower portion of the reactor shell, and defining a treatment-or combustion chamber in the complementary upper portion of the shell. This wind box structure is connected to a supply of fluidizing gas under pressure, and has delivery means or tuyeres for distributing the gas upwardly into a bed of material to be fluidized in the treatment-or combustion chamber.

According to one feature, an elongate rectangular reactor unit having sidewall, end walls, a bottom, and a roof is provided with a wind box structure of cylindrical or tubular shape, which may be horizontally coextensive with the elongate shape of the reactor. This feature may also be embodied in a wind box structure comprising a plurality of parallel elongate intercommunicating chambers.

Another feature of the invention lies in the provision of a plurality of feeders or self-contained feeding devices horizontally spaced from one another along the length of the reactor, and so arranged that the material to be burned in the fluidized bed, for instance dewatered sewage sludge or the like, is distributed effectively by the feeders over respective transverse sections or zones of the elongate fluidized bed.

For the purpose of waste disposal, a plurality of rectangular reactor units may be connected lengthwise to one another, providing a composite reactor system with feeders located all along one side of the system, each component unit being equipped with its own supply of fluidizing air, and its own exit for the combustion gases. Thus, the capacity of an existing reactor of this type may be increased by the addition lengthwise of component units.

Other features and advantages will hereinafter appear.

As this invention may be embodied in several forms without departing from the spirit or essential characteristics thereof, the present embodiment is (embodiments are) illustrative and not restrictive. The scope of the invention is defined by the appended claims rather than by the description preceding them, and all embodiments which fall within the meaning and range of equivalency of the claims are therefore intended to be embraced by those claims.

Figure 4:
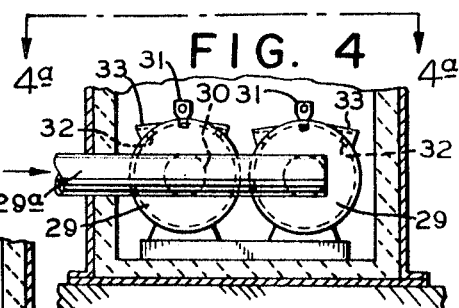
FIG. 4 is a fragmentary cross-sectional view of the reactor, showing a different form of the tubular concept of the wind box structure.

FIG. 4$^a$ is a plan view taken on line 4$^a$–4$^a$ of FIG. 4.

Figure 5:
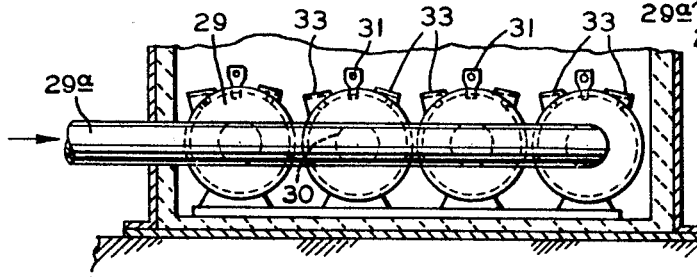
Figure 4A:
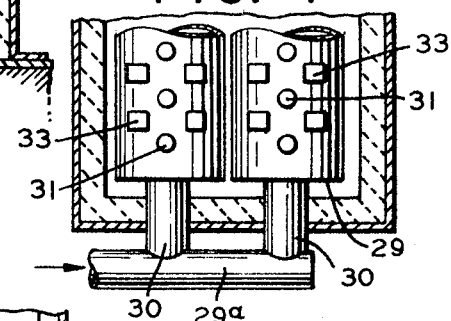

FIG. 5 is a fragmentary view similar to FIG. 4 showing a multiplicity of tubular chambers.

Figure 6:
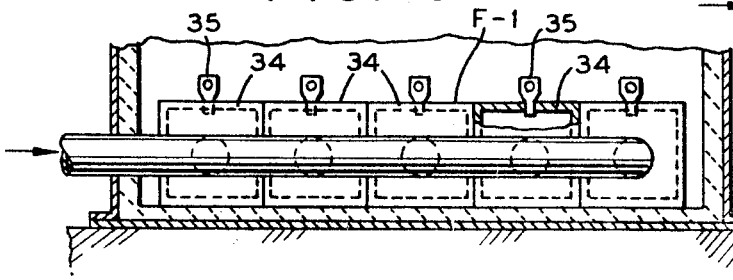

FIG. 6 is a fragmentary cross-sectional view similar to FIG. 5, with the tubular chambers forming a planar top face supporting the fluidized bed.

FIG. 7 is a similar fragmentary cross-sectional view, of a wind box structure in the form of a shallow rectangular chamber with stay bolts or the like interconnecting the top and bottom plates of the chamber.

FIG. 8 is a plan view taken on line 8–8 of FIG. 7.

FIG. 9 is a side view of a lengthwise assembly of rectangular reactor units embodying the invention, suited for the combustion of waste matter with laterally arranged feed devices.

FIG. 10 is a plan view taken on line 10–10 of FIG. 9.

Figure 1:
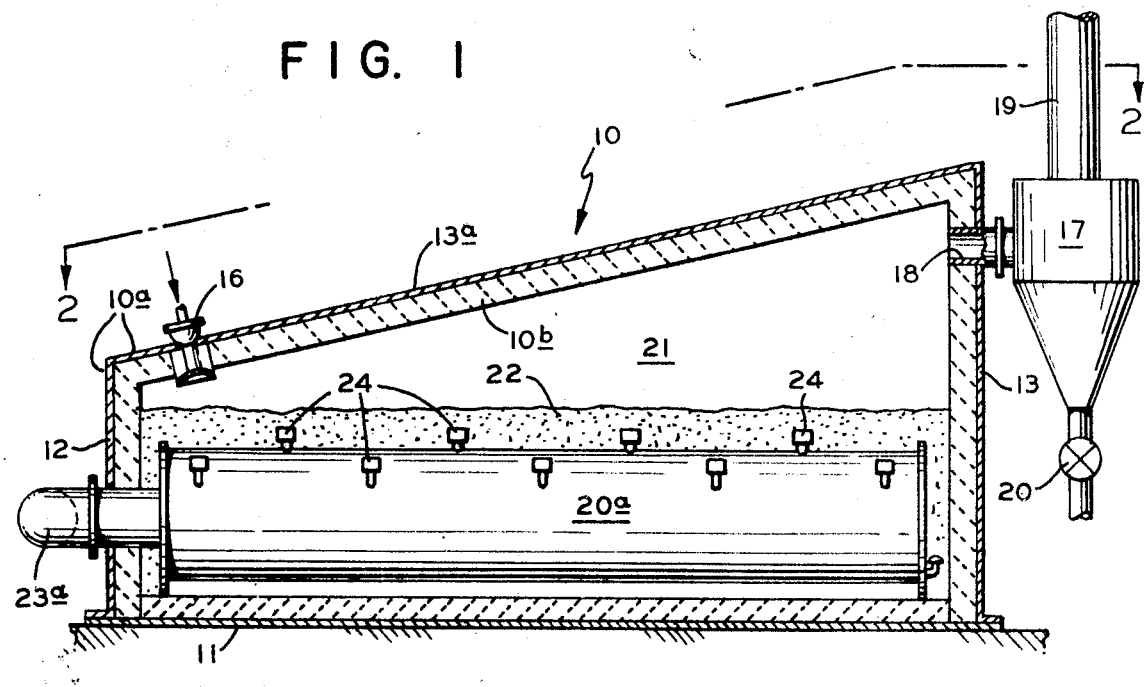
FIG. 1 is a longitudinal sectional view of a reactor, exemplifying the prefabricated wind box in the form of a tubular chamber, and suited for the combustion of waste matter with laterally arranged feed devices leading into the combustion chamber.
Figure 11:
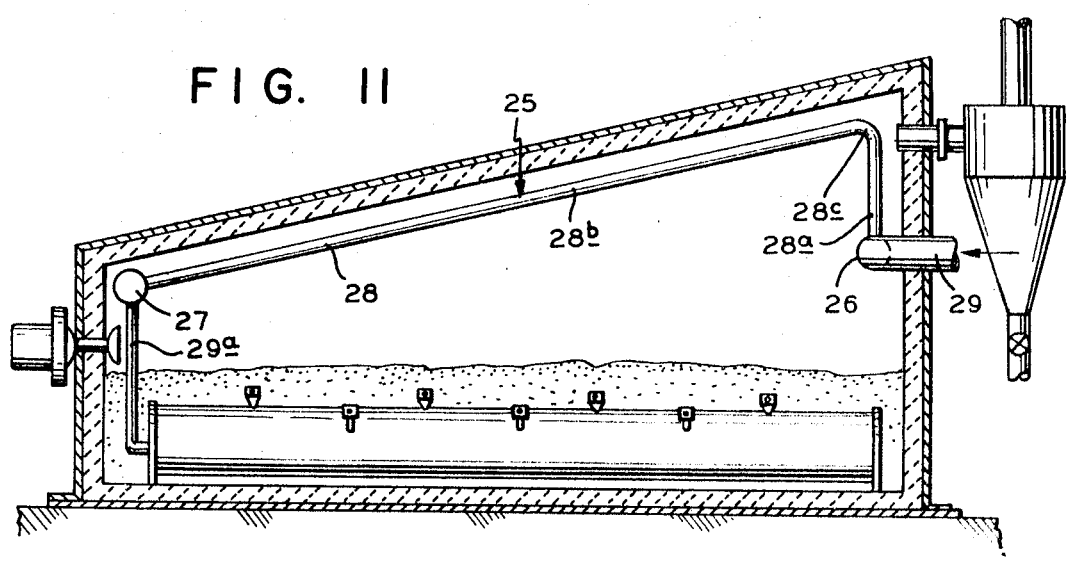

FIG. 11 is a longitudinal sectional view of the reactor, generally similar to FIG. 1, but suited for the treatment of materials with feed inlet at one end, and discharge for the treated material at the opposite end of the reactor.

Figure 12:
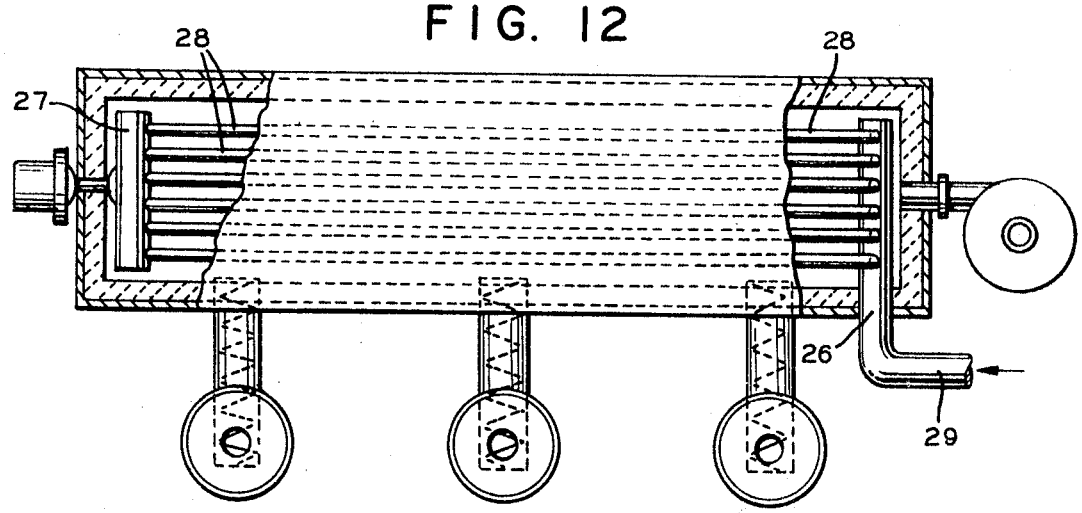

FIG. 12 is a part-sectional plan view of the reactor, taken on line 12–12 in FIG. 11.

Figure 13:
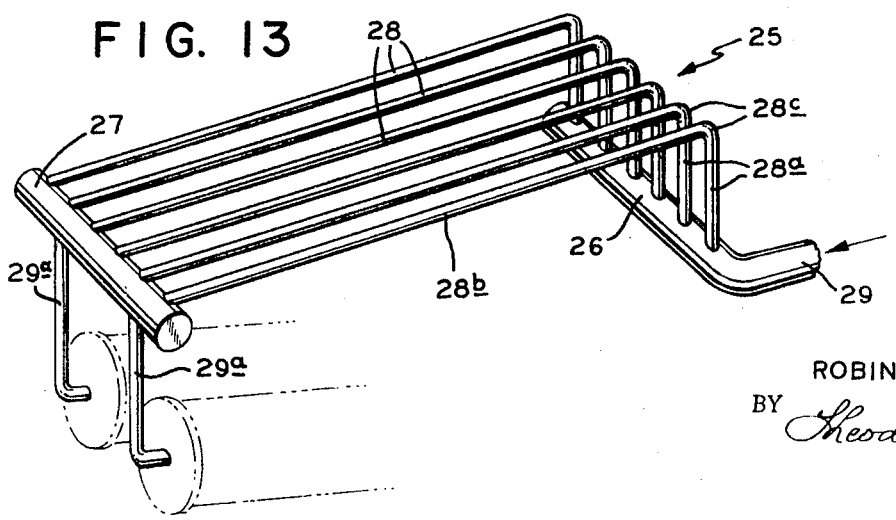

FIG. 13 is a longitudinal sectional view of the reactor similar to FIG. 1 with laterally arranged feed devices, additionally equipped with an air preheater tube system located in the combustion chamber.

Figure 14:
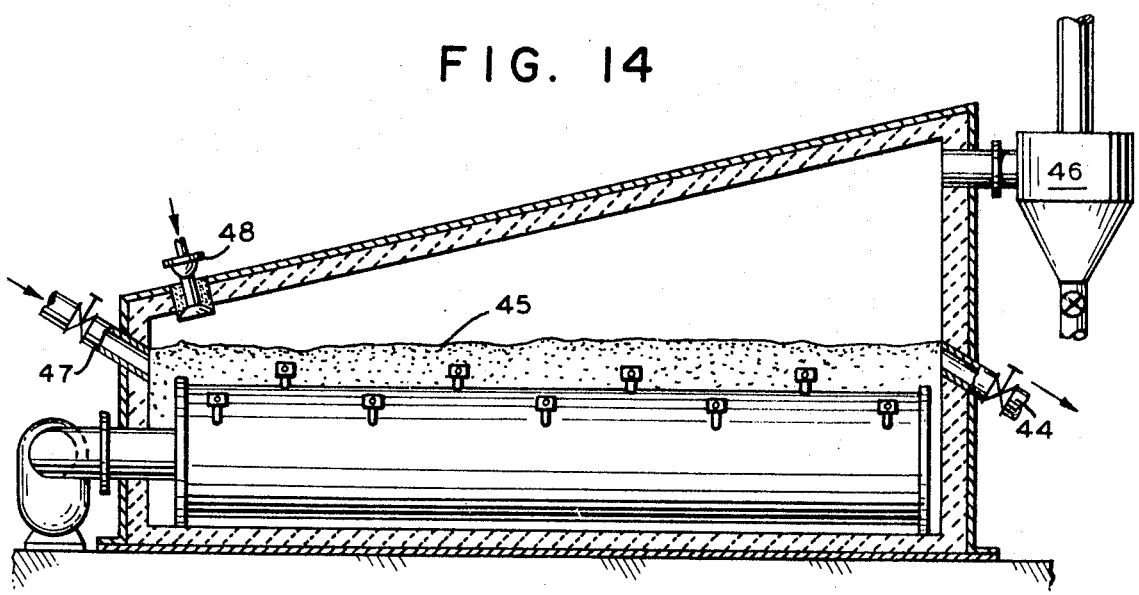

FIG. 14 is a part-sectional view of the reactor, taken on line 14–14 of FIG. 13.

Figure 15:
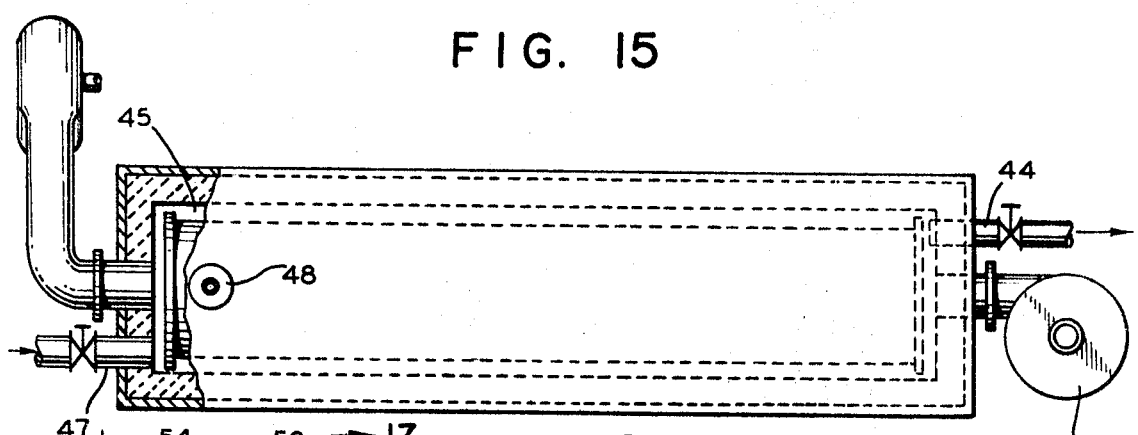

FIG. 15 is a skeleton view in perspective of the air preheater tube system of FIGS. 13 and 14.

Figure 16:
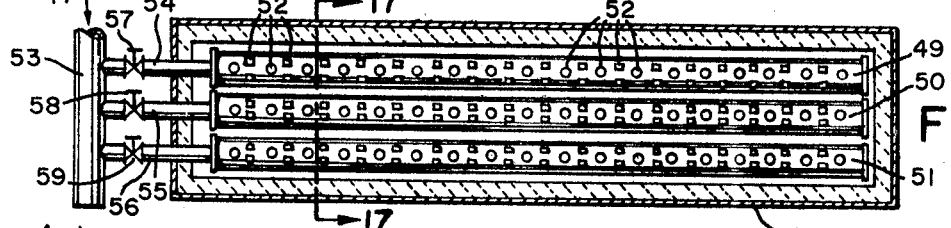

FIG. 16 is a plan view of a wind box structure having individual wind box chambers each having an individually controllable supply of fluidizing air.

Figure 17:
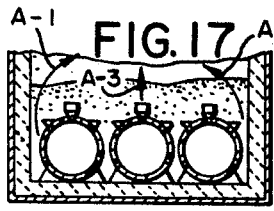

FIG. 17 is a cross-sectional view taken on line 17–17 in FIG. 16, illustrating the effect of the individual control.

Figure 18:
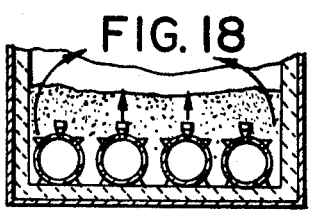

FIG. 18 is a cross-sectional view similar to FIG. 17, showing a modification.

Figure 2:
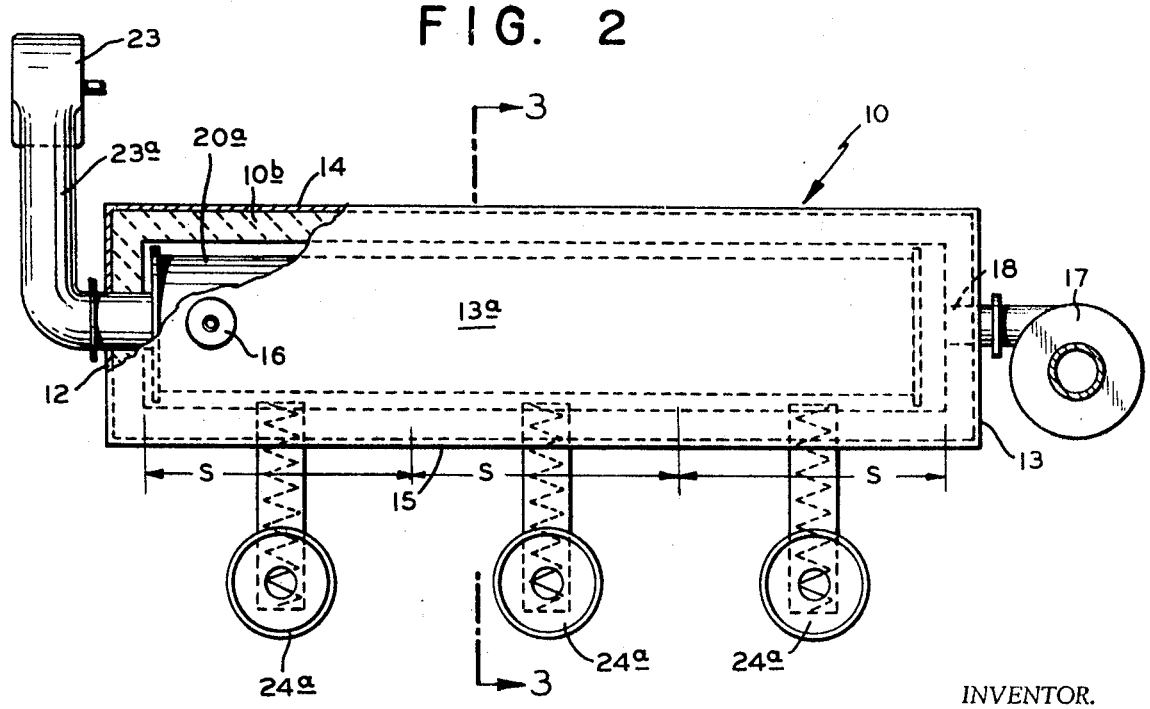
FIG. 2 is a plan view of the reactor taken on line 2–2 of FIG. 1.
Figure 3:
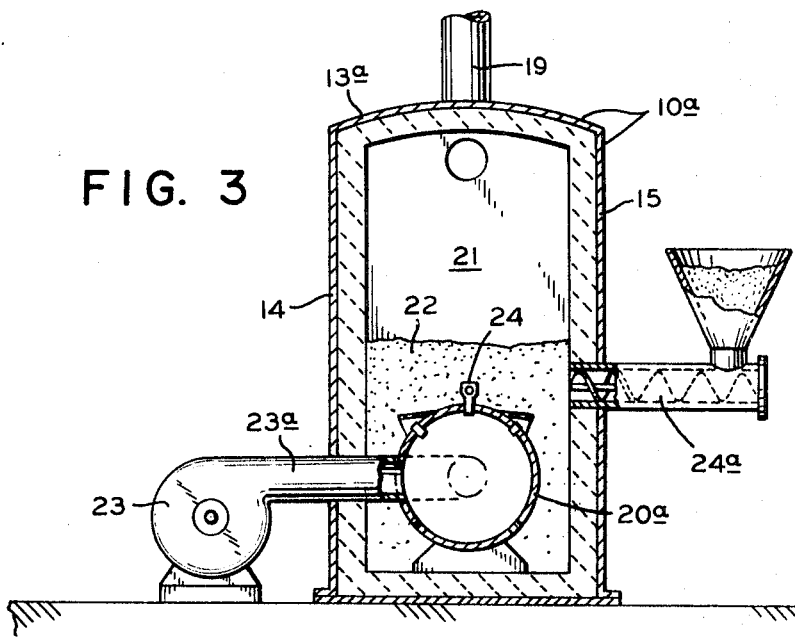
FIG. 3 is a cross-sectional view taken on line 3–3 of FIG. 1.

A longitudinal rectangular reactor as exemplified in the embodiment of FIGS. 1 to 3, is applicable to the combustion of waste material for instance of thickened sewage sludge, where the waste is fed into a fluidized bed of hot sand maintained at combustion temperatures.

In this embodiment, the reactor comprises an elongate housing 10 having a bottom 11, a low end wall 12, a high end wall 13, a roof 13$^a$ sloping down from the high end to the low end, and a pair of sidewalls 14 and 15. The housing is indicated as comprising a steel shell 10$^a$ provided with a refractory lining 10$^b$. The housing has an auxiliary—or starting burner 16 at the low end, and a dust-separating cyclone 17 at the high end for the combustion gases. The sloping roof accommodates the flow of the combustion gases that increase in volume from the low end to the high end of the reactor, where an exit pipe 18 for the gases leads into the cyclone from which a pipe or stack 19 delivers the dust-free gases into the atmosphere. Intercepted dust or ash particles are discharged through a cellular wheel 20 or other suitable discharge devices.

The housing contains a wind box 20$^a$ which according to this invention is a prefabricated self-contained structure occupying the lower portion of the housing. The space above this wind box represents the treatment—or combustion chamber 21 containing the fluidized bed 22. In this embodiment the wind box is in the form of tubular chamber coextensive with longitudinal extent of the housing, and designed to readily contain the wind box pressure of the fluidizing gas. In this way, the walls of the housing itself are subjected only to a much lower pressure which may be a fraction of the required wind box operating pressure.

The fluidizing gas under pressure is supplied by a blower 23 connected through pipe 23$^a$ to the wind box preferably at the low end of the housing. Air nozzles or so called tuyeres 24 mounted on the wind box chamber, distribute the combustion air into a bed of sand keeping the same fluidized. A plurality or row of screw feeders 24$^a$ or other suitable feeding devices for the waste material are mounted in one the sidewalls of the housing, horizontally spaced from one another, so that each feeder supplies waste material to a transverse area or section S of the fluidized bed. Hence, with the length of the rectangular reactor shown to be substantially greater than its width, the arrangement is such that each feeder will supply the associated section S of the bed in such a manner as to maintain substantially uniform combustion across the area of the bed.

Combustion of the waste material in the fluidized sand may be self-sustained where the moisture of the waste material or sewage sludge has been sufficiently reduced. But if need be, the combustion may be aided by the addition of supplemental fuel supplied for instance to burner 16, or otherwise. Also, preheating of the combustion air may be employed for maintaining required combustion temperatures.

An air preheating tube system 25 for heat exchange with the combustion gases is shown in FIGS. 11, 12 and 13, located within the combustion chamber itself. While the reactor is shown to be substantially the same as the one above described (FIGS. 1 to 3), the tube system 25 in a preferred form comprises a horizontal air inlet header 26 at the high end of the housing, a hot air discharge header 27 at the low end of the housing, and a plurality or bundle of heat exchange tube elements 28 interconnecting the headers 26 and 27. The inlet header has a supply connection 29 for compressed air, extending through the high wall to a blower not shown, while the discharge header has one or more connections 29$^a$ for delivery of preheated air into the adjacent end of the wind box chamber. Two such delivery connections are shown, providing between them the space for accommodating the auxiliary burner 16. The tube elements in this embodiment are shown to be identical and parallel to one another, and generally shaped to follow the inner contour of the housing. Thus, these tube elements comprise a vertical end portion 28$^a$ leading from header 26, a sloping portion 28$^b$ leading to header 27, and an intermediate bend portion 28$^c$.

The self-contained or prefabricated wind box of this invention may assume a variety of structural forms such as are illustrated in FIGS. 4, 4$^a$, 5, 6, 7, and 8. According to the embodiments in FIGS. 4, 4$^a$, and 5, a composite wind box structure comprises two or more tubular chambers 29 side by side and of smaller diameter than the one in FIG. 3. An outside horizontal supply header 29$^a$ for compressed air has branch connections 30 with the respective adjacent ends of the chambers or tubes 29. Each of these tubes may have one or more rows of air discharge nozzles or tuyeres 31 spaced from one another along the length of the tubes. There may be on each tube or chamber a central row of tuyeres 31 flanked by rows supplemental orifices 32 each of which has an air distribution shield 33 to prevent back seepage of particles of the bed material through the orifices. It will be understood that the tuyeres 31 may be of a suitable well-known type constructed to prevent back seepage of particles therethrough in case of shutdown of the reactor.

In the embodiment of FIG. 6, a composite wind box structure comprises a plurality of individual elongate chambers 34 side by side as those in FIG. 5, but of rectangular cross-sectional configuration, and thus providing a planar top face F-1 to support the fluidized bed. Nozzles or tuyeres 35 provided in any suitable disposition are thus all located in a common horizontal plane.

In the embodiment of FIGS. 7 and 8 a single wind box structure 36 is of actual box construction presenting a planar top face F-2 supporting a fluidized bed. This wind box therefore comprises a bottom plate 36$^a$ a top plate 36$^b$, interconnected by vertical walls 36$^c$, with nozzles or tuyeres 37 mounted in the top plate and thus located in a common horizontal plane. Vertical stay bolts 38 surrounded by tubular spacers 39 rigidly interconnect the top and bottom plates, thus rendering them highly resistant to the fluidizing gas pressure.

The underlying concept of this invention, that is the self-contained or prefabricated wind box structure, may also be embodied in the circular or cylindrical type of reactor, with the wind box structure than assuming a cylindrical or "pill box" shape.

According to FIGS. 9 and 10, a number of combustion-type reactors, operating in the manner of the ones above described, may be connected lengthwise to one another, but with a common fluidized bed extending from end to end of this assembly. Accordingly, a composite housing structure of the length L-1 comprises modular housing sections of the length L-2 each of which in turn is equipped with its own self-contained or prefabricated wind box system 40 and compressed fluidizing air supply 41, feed devices 42 for the waste matter or sewage sludge to be destroyed by thermal oxidation, and a cyclone 43 for the combustion gases, provided with a stack 43$^a$.

The reactor shown in FIGS. 14 and 15 although generally similar to the one shown in FIGS. 1 to 3, illustrates the use of this invention in fluidized bed treatment operations other than the waste combustion process presented in the preceding embodiments. Such other treatment operations as previously stated, may comprise calcining, roasting, drying-, or cooling operations where the material being treated or chemically altered constitutes the material of the fluidized bed itself. Accordingly, in this embodiment, a supply connection 47 allows the material to be treated to enter the reactor and the fluidized bed 45 at one end, preferably the low end of the reactor. A cyclone 46 may be used for separating the dust from the gases resulting from the operation. The opposite or high end of the reactor has a discharge connection 44 for the treated material which is thus caused to flow or travel from the inlet end to the outlet end of the reactor, while undergoing the required treatment or chemical conversion. An auxiliary burner 48 is here shown to be disposed in the roof of the reactor housing at the lower- or feed end thereof.

The embodiment in FIGS. 16, 17, and 18 according to the invention provides individual controls for the supply of fluidizing air to a plurality of wind box chamber constituting the wind box structure. Accordingly, in the example of FIGS. 16 and 17 an elongate rectangular reactor casing 48 contains a wind box structure consisting of three tubular horizontal parallel wind box chambers 49, 50, and 51, each having air discharge nozzles or tuyeres 52 such as previously referred, and an example of which is found in U.S. Pat. No. 2,841,476 to Dalton. An outside supply header 53 for the fluidizing air has branch connection 54, 55, and 56 with the adjacent ends of respective tubular wind box chambers. The branch connections in turn have control valves 57, 58, and 59 respectively. The valves may be operated in such a manner that fluidizing air is delivered relatively more intensely from the lateral tubular chambers 49 and 51 than from the central chamber 50, as indicated by flow arrows A-1, A-2, and A-3 respectively, in order that as a net result the fluidizing effect should be distributed more evenly across the area of the fluidizing bed. The modification in FIG. 18 illustrates a similarly controlled fluidizing effect with a large number of tubular wind box chambers.

It will be understood that this feature of selectively controlling the rate of supply of the fluidizing gas to the individual wind box chambers of a composite wind box structure is applicable to any of the foregoing embodiments wherein the wind box chambers have an external supply header and branch connections from the header to the adjacent ends of the wind box chambers. It will also be understood that the term horizontal tubular containers designating the individual wind box chambers may include those of circular—as will those of rectangular cross section.

I claim:

1. A fluidized bed reactor which comprises a reactor shell, a prefabricated wind box structure built for containing wind box gas pressure, located in the bottom portion of the reactor shell, and defining a combustion chamber in the complementary upper portion of said shell, said wind box structure having delivery means for distributing a fluidizing gas into a bed of material to be fluidized,
   conduit means connected to the wind box structure for supplying fluidizing air under pressure,
   feed means for supplying material for combustion into the combustion chamber,
   and exit means for the combustion gases.

2. The reactor according to claim 1, wherein said gas delivery means of the wind box structure comprises nonsifting tuyere units.

3. A fluidized bed reactor which comprises a reactor shell of rectangular elongate configuration, having a bottom, longitudinal sidewalls, end walls, and a roof,
   a prefabricated wind box structure built for containing wind box gas pressure, located in the bottom portion of the reactor shell and substantially conforming to the inner contour of said bottom portion, and thus defining a combustion chamber in the complementary upper portion of said shell, said wind box structure having delivery means for distributing a fluidizing gas into a bed of material to be fluidized;
   conduit means connected to the wind box structure for supplying fluidizing air under pressure;
   feed means for supplying material for combustion into the combustion chamber,
   and exit means for the combustion gases.

4. The reactor according to claim 3, wherein said wind box structure comprises a plurality of horizontal tubular containers in side-by-side arrangement, an external supply header for the fluidizing gas with branch connections leading from the supply header to the adjacent ends of respective containers.

5. The reactor according to claim 3, wherein each of said branch connection have valve devices operable for individually controlling the rate of supply of the fluidizing gas to the respective containers.

6. The reactor according to claim 3, wherein a plurality of feed devices are provided horizontally spaced from one another.

7. The reactor according to claim 3, wherein a plurality of feed devices are provided horizontally spaced from one another along one side of the reactor.

8. The reactor according to claim 3, wherein said wind box structure comprises at least one horizontal tubular container coextensive with the longitudinal extent of the reactor.

9. The reactor according to claim 3, wherein said wind box structure comprises a plurality of horizontal containers in a side-by-side arrangement, and communicating with one another.

10. The reactor according to claim 3, wherein said reactor shell comprises a sequence of tunnel-shaped sections connected endwise to one another so as to constitute a composite reactor system, with a fluidized bed adapted to extend from end to end of the system, each said section having at least one feed device, a stack for the combustion gases, and a self-contained wind box structure provided with individually controllable air pressure supply devices.

11. The reactor according to claim 3, wherein said gas delivery means of the wind box structure comprises nonsifting tuyere units.

12. A fluidized bed reactor which comprises a reactor shell of rectangular elongate configuration, having a bottom, longitudinal sidewalls, end walls, and a roof,
   a prefabricated wind box structure built for containing wind box gas pressure, located in the bottom portion of the reactor shell and substantially conforming to the inner contour of said bottom portion, and thus defining a combustion chamber in the complementary upper portion of said shell, said wind box structure having delivery means for distributing a fluidizing gas into a bed of material to be fluidized;
   conduit means connected to the wind box structure for supplying fluidizing air under pressure;
   feed means for supplying material for combustion into the combustion chamber,
   exit means for the combustion gases, an air preheater tube system located within the combustion chamber, and comprising a transverse inlet header located at one end of said chamber and adjacent one end of said wind box structure, a transverse outlet header located at the other end of said wind box structure, a plurality of tubes arranged side by side and substantially parallel to one another, interconnecting said inlet header and said outlet header, a cool air supply connection for said inlet header, and a connection between said outlet header and the adjacent end of said wind box structure, for passing preheated air into said wind box structure.

13. The reactor according to claim 12, wherein said exit means for the combustion gases are located adjacent to said inlet header.

14. The reactor according to claim 12, wherein a plurality of feed devices are provided horizontally spaced from one another.

15. The reactor according to claim 12, wherein a plurality of feed devices are provided horizontally spaced from one another along one side of the reactor.

16. The reactor according to claim 12, wherein said wind box structure comprises at least one tubular container coextensive with the longitudinal extend of the reactor.

17. The reactor according to claim 12, wherein said wind box structure comprises a plurality of horizontal ducts in side-by-side arrangement, and communicating with one another.

18. The reactor according to claim 12, wherein said wind box structure comprises a plurality of horizontal ducts in side-by-side arrangement, and an external supply header for the fluidizing gas with branch connections leading from the supply header to the adjacent ends of respective ducts.

19. The reactor according to claim 12, wherein said wind box structure comprises a plurality of horizontal ducts in side-by-side arrangement, an external supply header for the fluidizing gas with branch connections leading from the supply header to the adjacent ends of respective ducts, and said branch connections are provided with valve devices operable for individually controlling the rate of supply of the fluidizing gas to the respective ducts.

20. The reactor according to claim 12, wherein said wind box structure is in the form of a box having a flat top plate and a bottom plate, and is provided with internal stiffening means connecting the top plate with the bottom plate.

21. The reactor according to claim 12, wherein said stiffening means comprise bolts surrounded by spacer tubes.

22. The reactor according to claim 12, wherein said wind box structure comprises a plurality of ducts of rectangular cross-sectional configuration arranged side by side, and having their top faces extend in a common plane.

23. A fluidized bed reactor which comprises a reactor shell of rectangular elongate configuration, having a bottom, longitudinal sidewalls, end walls, and a roof, said shell being functionally divided into a wind box chamber and a combustion chamber above the wind box chamber, so that a fluidizing gas supplied under pressure to the wind box chamber rising into the reaction chamber will sustain a body of particulate material in a fluidized state,
   conduit means connected to said wind box chamber to supply combustion air under pressure,
   exit means for the combustious gases from the combustion chamber,
   and a plurality of feed devices horizontally spaced from one another along the length of the reactor.

24. A fluidized bed reactor which comprises a reactor shell, a prefabricated wind box structure built for containing wind box gas pressure, located in the bottom portion of the reactor shell, and defining a treatment chamber in the complementary upper portion of said shell, said wind box structure having delivery means for distributing a fluidizing gas into a bed of material to be fluidized,
   conduit means connected to the wind box structure for supplying fluidizing gas into the wind box under pressure;
   feed means for supplying material to be subjected to fluidization treatment in said chamber,
   discharge means for delivering treated material from said chamber,
   and exit means for the spent fluidizing gases.

25. The reactor according to claim 24, wherein said gas delivery means of the wind box structure comprise nonsifting tuyere units.

26. A fluidized bed reactor which comprises a reactor shell of rectangular elongate configuration, having a bottom, longitudinal sidewalls, end walls, and a roof;
   a prefabricated wind box structure built for containing wind box gas pressure, located in the bottom portion of the reactor shell, and thus defining a treatment chamber in the complementary upper portion of said shell, said wind box structure conforming to said elongate configuration, and having delivery means for distributing a fluidizing gas into a bed of material to be fluidized;
   conduit means connected to the wind box structure for supplying fluidizing gas into the wind box under pressure;
   feed means located at one end of the reactor, for supplying material to be subjected to fluidization treatment in said chamber,
   discharge means for delivering treated material from said chamber at the other end of the reactor,
   and exit means for the spent fluidizing gases.

27. The reactor according to claim 26, wherein said gas delivery means of the wind box structure comprise nonsifting tuyere units.

28. The reactor according to claim 26, wherein said wind box structure comprises at least one horizontal tubular container coextensive with the longitudinal extent of the reactor.

29. The reactor according to claim 26, wherein said wind box structure comprises a plurality of horizontal containers in side-by-side arrangement, and communicating with one another.

30. The reactor according to claim 26, wherein said wind box structure comprises a plurality of horizontal tubular containers in side-by-side arrangement, an external supply header for the fluidizing gas with branch connections leading from the supply header to the adjacent ends of respective tubular containers.

31. The reactor according to claim 30, wherein each of said branch connections has valve devices operable for individually controlling the rate of supply of the fluidizing gas to the respective containers.